Figure 5:
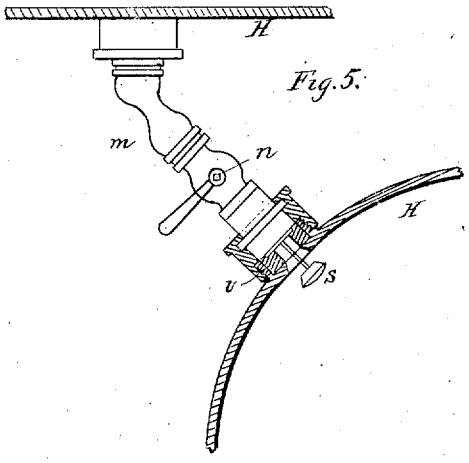

3 Sheets—Sheet 1.
J. P. BARNUM.
Assignor to himself, C. GODSHAW and J. S. CAIN.
AMMONIA SODA APPARATUS.
No. 11,135. Reissued Dec. 23, 1890.
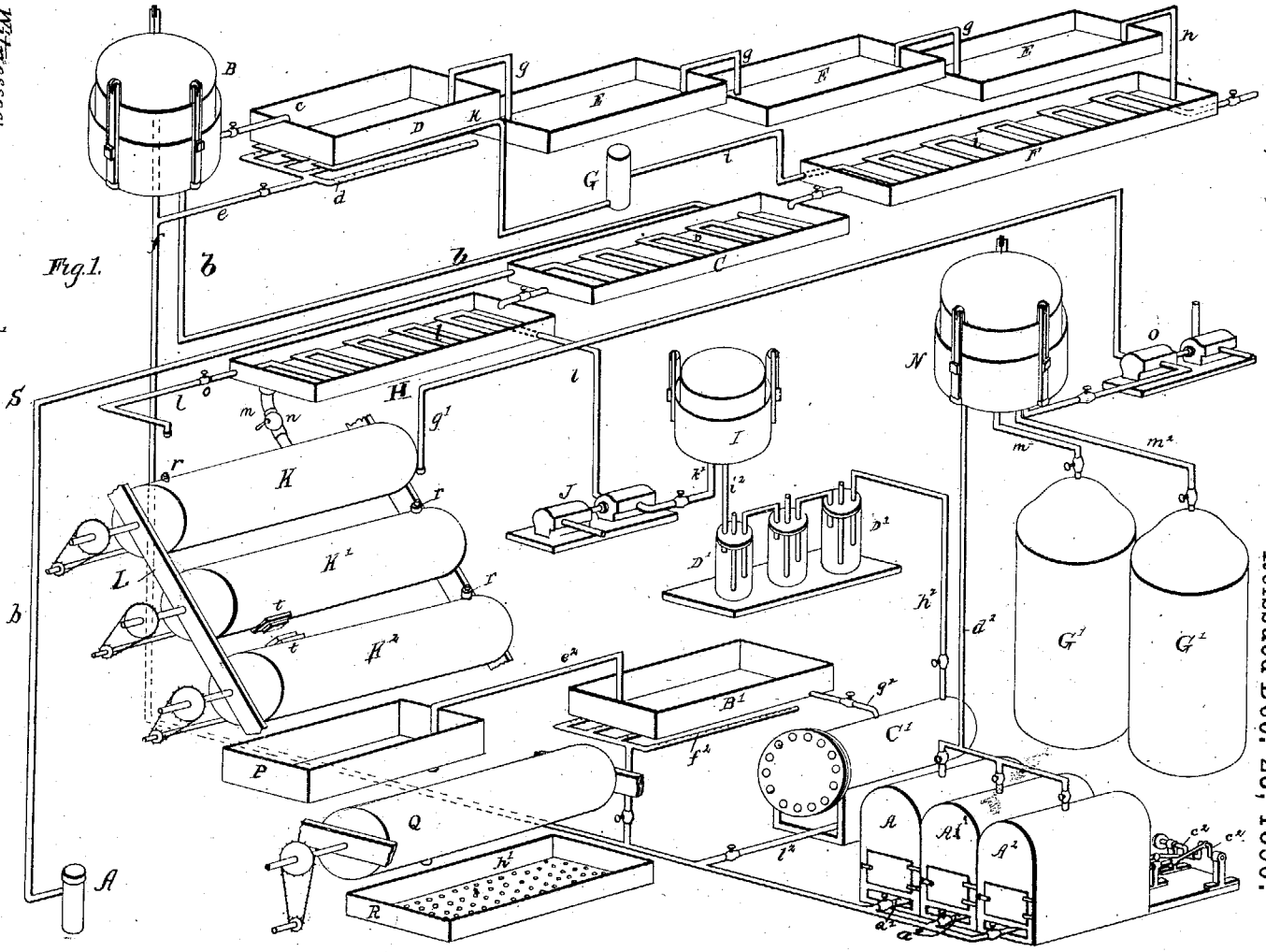
Fig. 1.
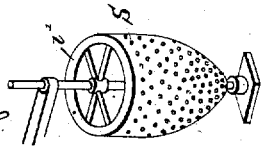
Witnesses:
Jona B. Cilley
Wm. Norton
Inventor:
Jos. P. Barnum
By his Attorney.
F. P. Brown

J. P. BARNUM.
Assignor to himself, C. GODSHAW and J. S. CAIN.
AMMONIA SODA APPARATUS.
No. 11,135. Reissued Dec. 23, 1890.
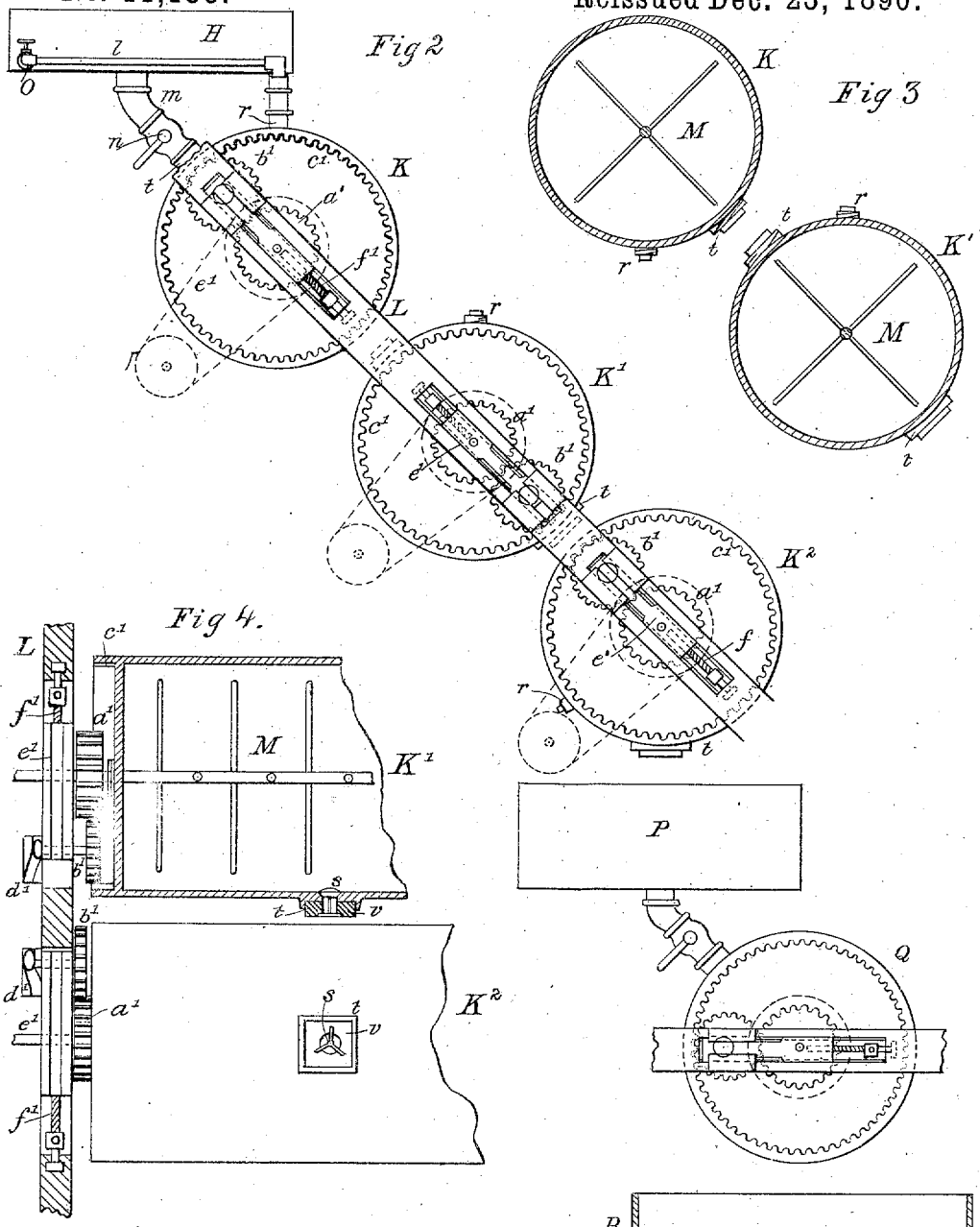
Witnesses:
Jona B. Cilley
Wm. Norton
Inventor:
Jos. P. Barnum
By his Attorney. F. P. Brown

J. P. BARNUM.

Assignor to himself, C. GODSHAW and J. S. CAIN.

AMMONIA SODA APPARATUS.

No. 11,135. Reissued Dec. 23, 1890.

Witnesses;
Jon'a B. Gilley.
Wm. Norton

Inventor;
Jno. P. Barnum
By his Attorney,
F. P. Brown

UNITED STATES PATENT OFFICE.

JOSEPH P. BARNUM, OF LOUISVILLE, KENTUCKY, ASSIGNOR TO HIMSELF, CHARLES GODSHAW, AND JOHN S. CAIN, OF SAME PLACE.

AMMONIA-SODA APPARATUS.

SPECIFICATION forming part of Reissued Letters Patent No. 11,135, dated December 23, 1890.

Original No. 409,382, dated August 20, 1889. Application for reissue filed October 10, 1890. Serial No. 368,604.

*To all whom it may concern:*

Be it known that I, JOSEPH P. BARNUM, of Louisville, in the county of Jefferson and State of Kentucky, have invented a new and Improved Apparatus for the Manufacture of Bicarbonate of Soda, of which the following is a full, clear, and exact description.

This invention relates to apparatus for the manufacture of bicarbonate of soda and other soda salts and compounds.

In the manufacture of carbonate and bicarbonate of soda by what is commonly known as the "ammonia process" the same has ordinarily heretofore been carried on by means of horizontal cylinders through which the ammonia and carbonic-acid gas are forced in one direction while a stream of salt-water flows in the opposite direction, thereby exposing only a thin surface of the liquid to the action of the gases, or else has been carried on in upright cylinders of a considerable height, down which the water is allowed to flow, subject to frequent obstructions by perforated partitions, in order to break up the streams of salt-water and to expose the salt-water to the action of the carbonic-acid gas and ammonia, which are forced in at the bottom or sides of said cylinders and which allow the salt-water to absorb the gas during its downward flow. The objection to this last method of proceeding is the loss of time and ammonia that takes place during the process, also the failure of certain portions of the salt-water that pass through the cylinders to be converted into bicarbonate of soda, and, furthermore, the choking or stopping of the orifices in the perforated partitions by the formation on the latter of a crust of bicarbonate of soda, which prevents the further use of the apparatus until it has been filled with water and heated by steam and the aforesaid crust has been dissolved.

My invention obviates these defects; and it consists in an apparatus of novel construction, and embracing various novel combinations of parts and devices, whereby special and improved results are produced, substantially as hereinafter described, and pointed out in the claims.

Reference is to be had to the accompanying drawings, forming a part of this specification, in which similar figures and letters of reference indicate corresponding parts in all the views.

Figure 6:
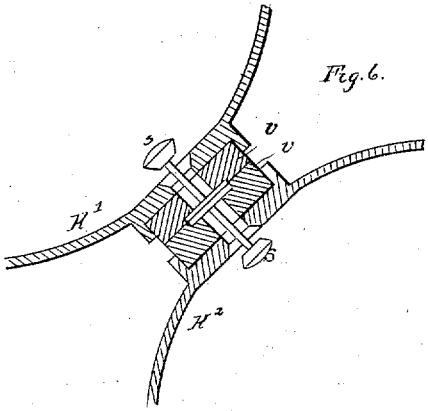
Figure 7:
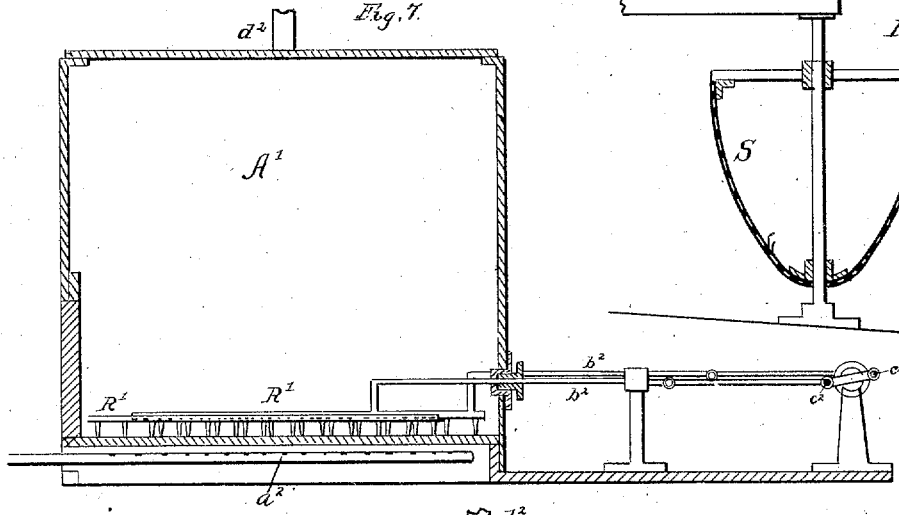
Figure 9:
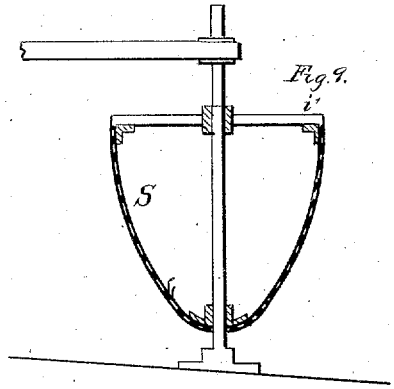
Figure 8:
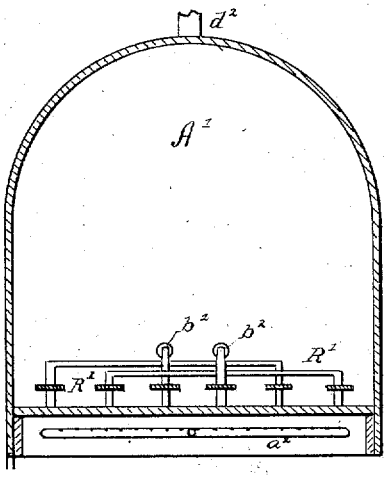

Figure 1 represents a view in perspective of an apparatus embodying my invention, showing a drier used in connection with the apparatus or forming part of it detached. Fig. 2 is an end elevation of a portion of the apparatus, mainly in illustration of a series of rotary cylinders used therein, and certain pans or receptacles with which said cylinders are combined; Fig. 3, a transverse section of two of the rotary cylinders with rotary beaters or agitators therein; Fig. 4, a partly-longitudinal section and elevation of two of such cylinders with mechanism for operating them and arresting their motion, as required; Fig. 5, a transverse sectional view of the first one of the series of rotary cylinders, in part, with connections for charging it from one of the pans or receptacles; Fig. 6, a transverse section of two of said cylinders, in part, with connections for passing the contents of one of said cylinders to the next; Fig. 7, a longitudinal sectional elevation of one of a series of ovens with attached mixers, used in some cases in connection with the apparatus; Fig. 8, a vertical transverse section of the same, and Fig. 9 a vertical sectional view of a drier used in the apparatus.

It may here be stated in advance of a detailed description of the apparatus shown in the drawings, that while the same may be profitably employed in the manufacture of soda wherever suitable materials can be found it becomes greatly more valuable when natural gas, salt-water, and limestone are found in close proximity, and, as here illustrated, the salt-water used in the apparatus, as also the gas to give the necessary heat, are supposed to be obtained from a salt-water marsh, as by a pump A, Fig. 1, or otherwise.

B indicates a gasometer and reservoir for the salt-water, which is supplied to it by pipes *b*, made to circulate, in the course of their passage to the receiver B, through a pan or vessel C, the use of which will be hereinafter explained. This gasometer and receiver B is placed at the highest level in the apparatus, so that the liquid from it will flow by its own gravity into the succeeding parts of the apparatus in regular order. The salt-water from the receiver B first flows by a pipe *c* into a boiling pan or vessel D, which is heated by means of gas-jet pipes *d* and boiled until the carbonic-acid gas is driven off and the iron, lime, and magnesia contained in the water as carbonates are precipitated, the heating-gas being supplied to the jet-pipes *d* by a pipe *e* from a stand-pipe *f*, or such heating-gas may be otherwise supplied and the salt-water may be otherwise introduced into the receiver B. After this the salt-water is drawn off by siphons *g* into a series consisting of any number of settling-pans E in succession arranged slightly one below the other, and in which the precipitated oxides of lime, iron, alumina, and magnesia are deposited, while the clear brine is drawn off by a pipe or siphon *h* into an evaporator F, which is heated by a coil of steam-pipe *i*, connected with a heater or boiler G, that may be supplied with water from a coil of pipes *k*, interposed between the gas-jet pipes *d* and the boiling pan or vessel D, or it may be otherwise supplied. When the brine has been evaporated to the point of saturation in the evaporator F, it is run into the pan or vessel C, within which the cold salt-water pipes *b* circulate, and when the temperature of the brine has thus been reduced as far as possible the cooled brine is run or siphoned off to an ammonia-cooler H, where its temperature is further reduced by the evaporation of the ammonia in a coil of pipes *l* within the cooler H, and brought to a point as nearly 32° Fahrenheit as practicable, so that the liquid may afterward be more thoroughly charged with ammonia, and whereby it is also prevented from being overheated in the succeeding parts of the operation. The ammonia is supplied to the pipes *l* from an ammonia-receiver I through or by a condensing-pump J, interposed between said receiver and the cooler H, and connected with such receiver and the pipes *l*. From the ammonia-cooler H the cool brine is transferred to the first one K of a series of approximately horizontal rotating cylinders K K′ K², as by a suitable coupling and uncoupling connection *m*, fitted with a cock *n*, and is there thoroughly charged with ammonia from the ammonia coil or pipes *l*, for which purpose the outlet end or portion of the pipes *l*, which is fitted with a cock *o*, is united by any suitable flexible or other removable connection with a nozzle *r* on the cylinder K. When said cylinder is properly charged with the cool brine impregnated with the ammonia, the connections between the cylinder K and the ammonia-pipes *l* are broken and the cocks *n* and *o* closed, the nozzle *r* is plugged or closed, and a self-closing valve *s*, Fig. 5, acted upon by a yielding rubber packing or spring *v*, shuts the orifice in the brine-supplying nozzle *t*, Fig. 2, of the cylinder K. These several cylinders K K′ K² are arranged one below the other, so that their contents may at suitable periods and for special treatments be emptied the one into the other next below it. They are each fitted to rotate within a suitable frame L, and are each fitted with a rotatable paddle-like stirrer M, that is made to revolve horizontally in a reverse direction to the cylinder itself. Any suitable means may be used for thus reversely rotating the cylinders and their inclosed stirrers, each cylinder being separately rotatable from the other. Thus each cylinder may be supported on the shaft of its stirrer, and said shaft may be driven by bands and pulleys, as shown in Figs. 1 and 2, with a gear *a′* on each shaft arranged to engage with another gear *b′*, that meshes into an inner circular rack *c′* of the cylinder for the purpose of rotating the latter in a reverse direction to its stirrer.

The gears *b′* are fitted to slide in and out of gear with the circular racks *c′* for the purpose of setting each cylinder in motion, as required, and for separately arresting their motions as needed. This may be done by securing each gear *b′* fast on a sliding spindle that may be worked in or out by suitably adjusting a button on the end of said spindle in and over or along a spirally-grooved guide *d′*, Fig. 4, or it may be done by any suitable means. The several cylinders are adjustable up and down to establish or break their connection with one another and with the means for charging them by means of sliding bearings *e′*, in which the shafts of the stirrers are hung and which are adjusted as by set-screws *f′*; or any other means may be used for making and breaking the connection between the cylinders. Each cylinder is fitted with a liquid-supplying nozzle *t* and with a separate gas or other charging nozzle *r*, capable of being closed when required, and when any two of the cylinders are brought into position and arrested so that their respective nozzles *t* are opposite each other and said cylinders adjusted to establish connection with one another the self-closing valves *s* of said nozzles are opened as a consequence of moving the cylinders together, and their spring rubber packings are compressed, as shown in Fig. 6, and whereby provision is made for emptying the contents of the upper cylinder into the one below it, after which said cylinders are separated to admit of their independent rotation. After the cool brine and the ammonia have been thoroughly mixed in the first cylinder K the motion of said cylinder is arrested and the contents of such cylinder transferred by the connections hereinbefore described or by others to the second cylinder K′, where the solution is charged, as through the nozzle *r* of said cylinder and a suitable removable connection between it and a pipe *q′*, with carbonic-acid-gas under high pressure from a gas-holder N and by the action of a condensing-pump O. The connection being broken between the cylinders K and K′ and the nozzle $r$ of the latter cylinder plugged, the cylinder K′, with its stirrer, is then rotated in reverse directions.

If desired, by changing the connections of the pump or pumps the same may be used for introducing both ammonia and carbonic-acid gas into the cylinder or cylinders at the same time, and by this means the chloride of soda can be converted into the bicarbonate of soda, while the chloride will unite with the ammonia, forming chloride of ammonia, which latter will remain permanently in solution. These results are thoroughly and rapidly accomplished by the revolving cylinders and their reversely-revolving stirrers, as described, and operated under high pressure. After the contents of the cylinder K′ have been sufficiently treated in said cylinder the same is then transferred by like means, as in the case of the cylinders K K′, to the cylinder $K^2$, the cylinders remaining stationary during this transfer, while the stirrers in them continue to revolve, in order that the contents may be agitated and the bicarbonate of soda thus formed be prevented from settling on the bottoms and sides of the cylinders and incrusting them. The cylinder $K^2$, having been disconnected from the cylinder above it, is then suitably rotated, together with its stirrer, running in a reverse direction. On the solution being tested, if any chloride of soda remains unconverted fresh ammonia and carbonic-acid gas are introduced into the cylinder $K^2$ until the whole is supercharged and all trace of chloride of soda removed. The excess of carbonic-acid gas is then returned to the receiver or gas-holder N and there retained for future use, while the resulting bicarbonate of soda and the solution of chloride of ammonia are emptied into a settling-pan P, and the solid matter is then drawn off into a suitably-driven rotary agitator Q, to be washed and to be freed from chloride of ammonia by being agitated in a solution of bicarbonate of soda or pure water, or a mixture of both. When thoroughly washed in the agitator Q, the contents of the latter are passed into a drainer R, which is constructed with a perforated bottom $h'$ through which the water holding the remaining chloride of ammonia and bicarbonate of soda is drained off and returned to the evaporator F, to be used in subsequent operations. The bicarbonate of soda is then placed in a centrifugal drier S, the body of which may be made from sheets of copper or other suitable material, and is perforated so as to present a series of holes, preferably elliptical in shape and of somewhat greater depth than width. This centrifugal drier S is suitably carried by a vertical shaft, and may be driven by any suitable gearing or by a band and pulley. It is fitted with a circular head or plate $i'$, which is fitted so as to be removable to allow of the drier either being emptied or filled. Said drier is connected with its shaft at the top by suitable braces or arms. A rapid motion is communicated to this drier, and whatever liquid remains mechanically mixed with the bicarbonate of soda is rapidly thrown off through the small openings in the drier, and the soda, thoroughly mixed and granulated by this operation, is retained in the drier, while the liquid thrown off may be drained by a sloping floor into a proper receptacle, and, together with the washings obtained in the settling-pan or drainer P, be then returned by force-pumps or otherwise to the evaporator F, to be used for recovery of the soda contained in it.

If desired to still further dry the bicarbonate of soda or to make soda-ash by driving off an equivalent of carbonic-acid gas from the bicarbonate of soda, the latter is transferred to a series of ovens A′, the bottoms of which are covered with either cast-iron, porcelain, or fire-brick plates, so as to present a smooth surface, and which should be so fitted to their places as to make the ovens as nearly as practicable air-tight when their doors are closed. These ovens may be heated by a series of gas-jet pipes $d^2$, which may take their supply from a downward extension of the stand-pipe $f$, and by means of suitable cocks the heat of the ovens may be so controlled as to either dry the bicarbonate of soda or to produce the carbonate, as desired. Within these ovens, and arranged to work over their bottoms, are a series, consisting of any number, of rakes or raking-frames R′, provided with suitably-shaped teeth. These frames are worked to and fro by means of rods $b^2$, connected with them, arranged to extend through stuffing-boxes in the backs of the ovens and suitably connected with eccentrics or cranks $c^2$ on a rotating shaft set so that the frames of teeth adjacent to one another will move in reverse directions simultaneously, thereby securing a thorough mixing and uniform heating or roasting of the soda contained in the ovens. The heating of these ovens by the gas-jet pipes $a^2$ should be so regulated that the finished bicarbonate of soda or soda-ash may be taken from the ovens ready for packing. The carbonic-acid gas resulting from such roasting of the product is then run by suitable pipe-connections $d^2$, fitted with cocks, into the carbonic-acid-gas receiver N, and there stored for further use. When the ovens are opened, either to be emptied or filled, the cocks in the pipes from them communicating with the receiver N are closed. The solution of the chloride of ammonia in the settling-pan P is drawn off by a siphon or pipe $e^2$ into another pan or vessel B′, and there concentrated by evaporation, said pan B′ being suitably heated for the purpose—as, for instance, by gas-jet pipes $f^2$, deriving their supply from the gas-pipe $f$ or otherwise—and when said solution has been sufficiently concentrated and reduced to a convenient bulk it is passed by a pipe $g^2$, fitted with a cock, into the ammonia-retort C′, which is then supplied with unslaked lime in suitable quantities, and the head of the retort afterward luted with soft fire-clay and tightened with bolts. By the slaking of the lime sufficient heat is generated to induce the decomposition of the chloride of ammonia, thereby forming chloride of calcium and liberating the ammonia in a gaseous state, which is then passed by a pipe $h^2$, fitted with a cock, to a series of connected wash-bottles D′, and from thence, through a pipe $i^2$, to the ammonia-receiver I, thence by a pipe $k^2$ to the condensing-pump J, by which it is compressed and then stored for subsequent use; or it may be passed directly through the pipes $l$ to the cooler H and there used for cooling the brine and afterward conducted into the rotary cylinder K. When the decomposition of the chloride of ammonia slackens, heat is applied to the retort C′—as, for instance, by gas derived by a pipe $l^2$ from the pipe $f$ or otherwise—until the chloride of ammonia is thoroughly decomposed and the ammonia driven off. The carbonic-acid gas to supply the holder or receiver N is supplied by the calcination of lime-rock in limekilns G′, and such gas passed from the kilns by pipes $m^2$ to the receiver N.

Among the advantages derived by this apparatus are the following: By decomposing the chloride of soda in the series of revolving air-tight cylinders, as described, and by use of the retort C′, especially constructed for the recovery of the ammonia from the chloride of ammonium, a great saving of ammonia is effected. There will also be a great saving of time by the treatment of the materials used under a high pressure and the thorough mixing of them by the revolving cylinders K K′ K² with their reversely-moving inside stirrers. Said revolving cylinders readily empty their contents one into the other, and by their being fitted with automatically opening and closing valves at their emptying-orifices after a suitable adjustment has been made of said cylinders a great convenience is attained and the cylinders are kept air-tight. If desired, however, these several cylinders may be connected by flexible hose fastened by easily-detached metal couplings and their openings be closed by other valves, stop-cocks, or like devices. By reason of the perfect admixture of the material used by means of the revolving cylinders with their stirrers a purer article of soda can be made and the manufacture can be kept up continuously, and with a fresh supply of carbonic-acid gas, when needed, all the chloride of soda can be converted into bicarbonate of soda. The operation, too, is generally automatic. Thus the salt-water by its own gravity flows from the gasometer or receiver B into the boiler D, thence into the settling-pans E, thence into the evaporator F, and from thence into the cooler C, while the natural gas found in connection with salt-water supplies the required fuel. A thorough separation of the precipitated bicarbonate of soda from the liquid chloride of ammonium takes place by the use of the washing-cylinder Q, the drainer R, and the centrifugal drier S. By passing the warm water through the cooler C the contents of the revolving cylinders K K′ K² are prevented from becoming overheated, and the temperature is still further reduced by passing it through the ammonia-cooler H.

In the operations which I have described certain important advantages are due to particular steps thereof and especially to that part of the process wherein the cooled salt-water is subjected to and is mingled with ammonia, which by its volatilization reduces the salt solution to a still lower temperature, which thereby converts the cylinder into a cooler, and also serves by the pressure produced by such volatilization to facilitate the emptying of the first cylinder into the next below of the series. This low temperature under pressure is important in effecting an immediate union of the soda and carbonic acid, and the heat produced by this chemical union is avoided, which thereby prevents frothing, the presence of which would render the complete combination of the elements slow and unsatisfactory. In this part of my improvement the salt solution is intimately mixed with the gas in a few minutes, which otherwise would require hours. The stopping of the motion of the cylinders while the stirrers continue in operation causes the highest pressure within the cylinder at such time, and thereby insures the entire and rapid emptying of the contents of the cylinders and the thorough cleaning out of the bicarbonate of soda resulting from the chemical action. In this operation the provision of the soft-rubber packing-blocks for effecting an air-tight communication between the cylinders is of the highest importance. In the practical working of this apparatus I have been able to obtain the results stated in from thirty to thirty-five minutes, when about twelve hours would be required with any other apparatus of which I have any knowledge.

Having thus described my invention, what I claim as new, and desire to secure by Letters Patent, is—

1. In apparatus for the manufacture of bicarbonate of soda, the combination of an elevated salt-water receiver and gasometer provided with a stand-pipe for gas, a boiler into which the water is run from said receiver, a series of settling-pans in successive connection with each other and the boiler, an evaporating pan or vessel into which the brine is passed from the settling-pans, and a cooler connected with the evaporating pan or vessel for operation in relation to each other, a series of horizontal rotating cylinders provided with reversely-rotating stirrers, and means for connecting and supplying said cylinders with a decomposing agent under pressure, consisting of suitable valve-controlled couplings for said cylinders, a gas-holder, suitable pipe-connections for the latter and said cylinders, and a suitable device for charging said cylinders with the decomposing agent under pressure, substantially as specified.

2. In apparatus for the manufacture of bicarbonate of soda, a plant consisting of means for boiling, settling, cooling, and decomposing the salt solution, the settling-pan P, the rotary agitator and washer Q, the drainer R, and the centrifugal drier S, essentially as described.

3. In apparatus for the manufacture of bicarbonate of soda and other soda salts and compounds, the combination of the elevated salt-water receiver and gasometer B with its supply-pipe *b* and gas-pipe *f*, the boiling pan or vessel D, the settling-pans E, the evaporator F, the coolers C H, and the series of air-tight decomposing-cylinders K K′ K², provided internally with reversely-rotating stirrers and arranged one below the other and adapted to pass their charges one into the other, substantially as described.

4. In apparatus for the manufacture of bicarbonate of soda, a plant consisting of means for supplying the salt-water, boiling, settling, evaporating, and cooling the brine, the decomposing-cylinders K K′ K², the ammonia-receiver I, the carbonic-acid-gas receiver N, the condensing-pumps J O, and the pipes *l g′*, essentially as described.

5. In apparatus for the manufacture of bicarbonate of soda, a plant consisting of means for supplying the salt-water, boiling, settling, evaporating, and cooling the brine, the settling-pan P, the concentrating-pan B′, the ammonia-retort C′, the washing-bottles D′, the ammonia-receiver I, and the condensing-pump J, substantially as described.

6. In apparatus for the manufacture of bicarbonate of soda and other soda salts and compounds, the combination, with said apparatus, of the drying-ovens A′, with their agitating-frames R′, the pipe *d*², the carbonic-acid-gas holder or receiver N, and the condensing-pump O, essentially as described.

7. In apparatus for the manufacture of bicarbonate of soda and other soda salts and compounds, a plant consisting of the salt-water receiver B, arranged to occupy an elevated position for passage of the brine by gravity through the apparatus, the water-supply pipe *b* to said receiver, the stand gas-pipe *f*, extended downward and provided with attached gas-jet pipes for supplying the apparatus with fuel from said receiver, the boiler D, the settling-pans E, the evaporator F, with its heating-pipes *i*, the cooler C, having the water-supply pipe *b*, made to circulate through it, the ammonia-cooling pan or vessel H, the ammonia-receiver I, and carbonic-acid-gas holder N, with their attached condensing-pumps J O and pipes *l g′*, the series of air-tight decomposing-cylinders K K′ K², the settling-pan P, the concentrating-pan B′, the ammonia-retort C′, connected with the ammonia-receiver I, the rotary washer and agitator Q, the drainer R, and the centrifugal drier S, substantially as specified.

8. In apparatus for the manufacture of bicarbonate of soda, a plant consisting of means for supplying the salt-water, boiling, settling, evaporating, and cooling the brine, a series of decomposing-cylinders in co-operative relation, the stirrers in said cylinders, means for revolving the cylinders and the stirrers in reverse directions, and provisions for washing and drying the salts, substantially as described.

9. In apparatus for the manufacture of bicarbonate of soda, the combination of means for boiling, settling, evaporating, and cooling the brine, and a series of decomposing-cylinders, stirrers in said cylinders, and means for revolving the cylinders and the stirrers in reverse directions, elastic couplings for connecting the cylinders, adjustable bearings for said cylinders, whereby they are brought in connection and separated, and means for supplying the decomposing agents to said cylinders, substantially as described.

10. In apparatus for the manufacture of bicarbonate of soda, the combination, with means for boiling, settling, evaporating, and cooling the brine, of a connected series of revolving decomposing-cylinders, stirrers in the cylinders, gearing between the cylinders and stirrers for revolving the said cylinders in opposite directions to said stirrers, and means for disconnecting the gearing between the cylinders and the stirrers, whereby the cylinders are brought to a standstill while the stirrers are kept in motion, for the purpose stated.

11. In apparatus for the manufacture of bicarbonate of soda, the combination, with a boiler, means for supplying thereto the salt-water, a series of settling-pans in successive connection with each other and with the boiler, an evaporating-pan to receive the brine from the settling-pans, and a cooler to receive the brine from the evaporating-pan, of a series of horizontal rotating decomposing-cylinders provided with reversely-rotating stirrers, and means for connecting and supplying them with a decomposing agent under pressure, consisting of suitable valve-controlled couplings for said cylinders, a gas-holder, suitable pipe-connections for the latter and said cylinders, and a suitable device for charging said cylinders with the decomposing agent under pressure, substantially as described.

JOSEPH P. BARNUM.

Witnesses:

J. W. BRYANT,

CHAS. LOWE.